United States Patent
Callon et al.

(10) Patent No.: US 7,921,460 B1
(45) Date of Patent: Apr. 5, 2011

(54) RATE LIMITING DATA TRAFFIC IN A NETWORK

(75) Inventors: Ross W. Callon, Westford, MA (US); Frank Kastenholz, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 226 days.

(21) Appl. No.: 12/120,741

(22) Filed: May 15, 2008

Related U.S. Application Data

(63) Continuation of application No. 10/431,395, filed on May 8, 2003, now Pat. No. 7,389,537, which is a continuation-in-part of application No. 10/080,865, filed on Feb. 21, 2002, now abandoned.

(60) Provisional application No. 60/328,489, filed on Oct. 9, 2001.

(51) Int. Cl.
*G06F 11/00* (2006.01)

(52) U.S. Cl. .................. 726/22; 726/13; 713/153

(58) Field of Classification Search .......... 726/22–25, 726/11–13; 709/223–225, 229, 232–234; 713/151–154; 370/237, 351, 356
See application file for complete search history.

(56) References Cited

U.S. PATENT DOCUMENTS

| | | | | |
|---|---|---|---|---|
| 5,968,128 | A | 10/1999 | Lauck et al. | 709/232 |
| 6,046,980 | A * | 4/2000 | Packer | 370/230 |
| 6,047,322 | A * | 4/2000 | Vaid et al. | 709/224 |
| 6,052,718 | A | 4/2000 | Gifford | |
| 6,119,235 | A | 9/2000 | Vaid et al. | 726/11 |
| 6,167,445 | A | 12/2000 | Gai et al. | 709/223 |
| 6,233,240 | B1 | 5/2001 | Barbas et al. | 370/395.62 |
| 6,404,732 | B1 | 6/2002 | van Nee | 370/209 |
| 6,453,345 | B2 | 9/2002 | Trcka et al. | 709/224 |
| 6,499,107 | B1 | 12/2002 | Gleichauf et al. | 726/23 |
| 6,505,244 | B1 | 1/2003 | Natarajan et al. | 709/223 |
| 6,560,654 | B1 | 5/2003 | Fedyk et al. | 709/239 |
| 6,628,610 | B1 | 9/2003 | Waclawsky et al. | 370/229 |
| 6,735,702 | B1 | 5/2004 | Yavatkar et al. | |
| 6,760,777 | B1 | 7/2004 | Agarwal et al. | |
| 6,880,090 | B1 | 4/2005 | Shawcross | 726/14 |
| 6,886,102 | B1 | 4/2005 | Lyle | 726/23 |
| 6,940,852 | B1 | 9/2005 | Washburn | 370/389 |
| 6,959,002 | B2 | 10/2005 | Wynne et al. | 370/412 |
| 7,002,977 | B1 | 2/2006 | Jogalekar | 370/410 |
| 7,028,179 | B2 | 4/2006 | Anderson et al. | 713/154 |
| 7,051,367 | B1 | 5/2006 | Krishnaswamy et al. | 726/22 |
| 7,054,930 | B1 | 5/2006 | Cheriton | 709/226 |
| 7,058,015 | B1 * | 6/2006 | Wetherall et al. | 370/236 |
| 7,092,357 | B1 | 8/2006 | Ye | 370/230 |

(Continued)

OTHER PUBLICATIONS

U.S. Appl. No. 10/234,455, filed Sep. 5, 2002; Ben Eater et al.; "Systems and Methods for Identifying Sources of Network Attacks;" pp. 1-28 (specification); Figs. 1-6 (6 pages).

(Continued)

*Primary Examiner* — Nirav Patel
(74) *Attorney, Agent, or Firm* — Harrity & Harrity, LLP

(57) ABSTRACT

A network device coordinates with other devices in a network to create a distributed filtering system. The device detects an attack in the network, such as a distributed denial of service attack, and forwards attack information to the other devices. The devices may categorize data into one or more groups and rate limit the amount of data being forwarded based on rate limits for the particular categories. The rate limits may also be updated based on the network conditions. The rate limits may further be used to guarantee bandwidth for certain categories of data.

22 Claims, 13 Drawing Sheets

U.S. PATENT DOCUMENTS

| | | | |
|---|---|---|---|
| 7,139,838 B1 | 11/2006 | Squire et al. | |
| 7,200,684 B1 | 4/2007 | Schales et al. | 709/252 |
| 7,215,637 B1 | 5/2007 | Ferguson et al. | 370/230.1 |
| 7,249,376 B2 | 7/2007 | Wesinger et al. | |
| 7,295,516 B1 * | 11/2007 | Ye | 370/232 |
| 2002/0016926 A1 | 2/2002 | Nguyen et al. | 713/201 |
| 2002/0032854 A1 | 3/2002 | Chen et al. | 713/151 |
| 2002/0101819 A1 | 8/2002 | Goldstone | 370/229 |
| 2002/0103921 A1 | 8/2002 | Nair et al. | 709/232 |
| 2002/0157020 A1 | 10/2002 | Royer | 713/201 |
| 2003/0033421 A1 * | 2/2003 | Haeri et al. | 709/232 |
| 2003/0039245 A1 | 2/2003 | Khosravi et al. | 370/389 |
| 2003/0065948 A1 | 4/2003 | Wilkes | 713/201 |
| 2004/0066746 A1 | 4/2004 | Matsunaga | 370/235 |

OTHER PUBLICATIONS

U.S. Appl. No. 10/281,446, filed Oct. 25, 2002; Scott Mackie; "Dynamically Inserting Filters Into Forwarding Paths of a Network Device;" pp. 1-17 (specification); Figs. 1-4 (4 pages).

U.S. Appl. No. 10/080,865, filed Feb. 21, 2002; Ross W. Callon; "Distributed Filtering for Networks;" pp. 1-40 (specification); Figs. 1-11 (11 pages).

U.S. Appl. No. 10/431,395, filed May 8, 2003; Ross W. Callon et al.; "Rate Limiting Data Traffic in a Network;" pp. 1-56 (specification); Figs. 1-13 (13 pages).

Steve Gibson; DRDoS; Distributed Reflection Denial of Service; Gibson Research Corporation; http://grc.com/dos/drdos.htm; Feb. 22, 2002; pp. 1-23.

* cited by examiner

RATE LIMITING DATA TRAFFIC IN A NETWORK

RELATED APPLICATIONS

This application is a continuation of U.S. patent application Ser. No. 10/431,395 filed May 8, 2003 entitled "Rate Limiting Data Traffic in a Network", now U.S. Pat. No. 7,389,537, the disclosure of which is incorporated herein by reference, which is a continuation-in-part of U.S. patent application Ser. No. 10/080,865 entitled "Distributed Filtering for Networks", filed Feb. 21, 2002, now abandoned the disclosure of which is incorporated herein by reference, which claims priority under 35 U.S.C. §119 based on U.S. Provisional Patent Application No. 60/328,489, filed Oct. 9, 2001. This application claims priority of U.S. Provisional Application No. 60/328,489, the disclosure of which is also incorporated herein by reference.

BACKGROUND OF THE INVENTION

The present invention relates generally to data processing systems and, more particularly, to systems and methods for filtering network traffic based on attacks.

The Internet consists of multiple interconnected networks that transfer data between a large number of devices, such as servers and clients. Routers are used to transfer the data in packets over communication links that connect the routers, clients, and servers.

Protocols specify how each device in the network interoperates with other devices. For example, the Internet Protocol (IP) specifies the format for packets. Routing protocols are used in routers to select paths through the network. Other protocols specify the manner in which a client requests information from a server, and the manner in which the server returns the requested information to the client.

FIG. 1 illustrates clients and servers exchanging packets. The exchanges are shown using broken line arrows. In FIG. 1, a client connected to router C exchanges packets with a client connected to router A and a server connected to router D. Exchanging packets directly between clients is known as peer-to-peer networking. Packets may also be transferred directly between servers, illustrated in FIG. 1 by the server connected to router D exchanging packets with the server connected to router B. Server-to-server communication may occur, for example, when one server needs information from another server to respond to a client request.

Devices on the network often communicate freely with one another. For example, in FIG. 1 servers and clients communicate freely with each other. Sometimes, however, networks restrict access in certain ways. For example, a corporate network may limit network access to only employees of that corporation and customers. Although certain areas of a corporate network may be accessed by employees and customers, other certain areas may be limited to access by employees only.

Routers may be used to limit certain traffic flowing through the router. In some cases, for example, routers are configured to only forward packets that have particular characteristics, such as certain source and destination addresses from a list of permitted addresses.

One way to limit access to a particular group of users is a virtual private network (VPN). A VPN uses services provided by a public network, such as an Internet Service Provider (ISP), to connect particular users to one another, such as employees of a corporation. A VPN often makes use of a firewall between all or part of the VPN and the public network. The firewall filters traffic to ensure that traffic entering the VPN is traffic from another site of the same corporation, or from authorized users, such as customers, suppliers, and corporate partners.

Servers in the VPN handle requests from clients in the VPN. The rate of requests to the servers can be quite significant, and generally enough servers are deployed to fulfill the requests. There is usually even a substantial extra capacity for peak times when the rate of requests increase. Every server, however, has a limit as to the rate it can respond to requests for services. If requests arrive too rapidly, service may be adversely affected if the servers cannot keep up with the rate of requests. Similarly, a given router, and a given communications link, also has a capacity limit.

Networks are under almost constant attacks by malicious users who wish to disrupt the network. One of the most common forms of attacks is a denial of service (DOS) attack in which a large number of request packets are sent to a server at a high rate and the server cannot keep up with the requests. Ultimately, the server is so overloaded that adequate service to legitimate clients is denied.

One common way to perform such an attack is to carry out a distributed denial of service (DDOS) attack. In a DDOS attack, multiple distributed systems are used in coordination to overload a server. In one form of DDOS attack, a computer virus or worm is used to configure multiple distributed computer systems to carry out the attack. The computer systems are usually innocent and are being used by someone to unwittingly carry out the attack. For example, multiple computer systems at a university may be configured over a network to simultaneously begin transmitting a large volume of traffic (e.g., malicious packets) at a high rate to the same server. This results in a very large traffic load on the server and sometimes also on communications links used to access the server.

FIG. 2 illustrates a DDOS attack on a server. The firewall in FIG. 2 is implemented physically separate from the server, sitting between the server and a network router. In this implementation, the firewall receives network traffic from the router, filters the network traffic for attacks, and forwards acceptable traffic to the server.

Although the firewall illustrated in FIG. 2 is implemented physically separate from the server, some firewalls run directly on the server. A firewall running on a server operates in essentially the same manner as a physically separate firewall—examining incoming traffic and determining whether the traffic should be allowed to enter.

In FIG. 2, each malicious user has been configured to simultaneously bombard the server with malicious packets in an attempt to flood the server. In the attack is successful, the server will receive more requests than it can handle. This results in some combination of failure of the server, severe congestion on communications resources, such as links or routers in the network, or seriously disrupted service to legitimate users.

The firewall is used to detect the attacks. Upon detecting an attack, the firewall attempts to identify the malicious packets and drop them. Conventional firewalls are often implemented in software, but may be implemented in hardware, or both software and hardware. The firewall typically performs stateful filtering, which means that the firewall maintains state information related to recent requests for service sent to a server. Keeping track of recent requests to a server is necessary to detect attacks. In a DOS attack, for example, any one request might be valid when considered alone, but when multiple requests are considered together a malicious attack might be identified. When multiple requests come in from the same source, for example, the server may determine that the source is taking part in the attack and discard future requests for information from the source.

Although FIG. 2 illustrates using a firewall to detect an attack on a server, the firewall may also be used to detect an attack on any entity, such as a VPN. In this case, the firewall may be used to prevent unauthorized or malicious users from accessing the corporate network by discarding inappropriate packets at the firewall.

Note that, in general, detecting an attack needs to occur at one place since each malicious user participating in the attack might be sending few enough packets that it is not obvious that those packets are part of an attack. This has led to solutions where detection and defense against attacks occurs in one device. In other words, the discarding of the malicious packets occurs at the same device that detected the attack.

The malicious packets arriving at a single location creates other problems in addition to overloading the server. In many cases the link from the local router to the server and/or firewall will be sized just large enough to handle legitimate traffic expected by the server. The link from the router to the firewall may itself become so congested that service is denied. Thus, even if malicious packets are successfully discarded at the firewall, the loss of bandwidth on the link between the router and the server or firewall still represents a significant denial of service. Thus, even if the malicious packets are discarded before they reach the server in FIG. 2, the attack may nonetheless be successful, or at least partially successful. A sufficiently large attack may also congest other links in the communications network.

Another problem may arise because operation of the firewall consumes considerable resources. Thus, even after a firewall detects an attack, it still needs to spend some amount of CPU resources to discard each malicious packet. This problem is more of an issue when the firewall is running on the server, and is not as drastic in the physically separate firewall implementation illustrated in FIG. 2 because in the physically separate implementation the server itself does not consume its resources discarding packets. The firewall in FIG. 2, however, represents additional cost to the network. In addition, the network resources, including but not limited to the link from the local router to the firewall or server, need to carry the additional traffic, which therefore also represents wasted resources.

Thus, there is a need for adequately addressing attacks occurring in the network.

SUMMARY OF THE INVENTION

Systems and methods consistent with the principles of the invention address this and other needs by detecting an attack and rate limiting an amount of data being forwarded by one or more routers. The data rates may be dynamically adjusted based on the amount of data received after the attack has been detected. In addition, the data may be grouped into categories based on various parameters or characteristics associated with the data. The data may then be rate limited based on the particular group in which it falls.

In accordance with one implementation consistent with the principles of the invention, a network device that includes a receiver and logic is provided. The receiver is configured to receive data from a network and the logic is configured to detect an attack based on the received data. The logic is also configured to transmit first control information to at least one other network device in the network after detecting the attack, where the first control information includes rate limit information associated with forwarding data.

In another implementation consistent with the principles of the invention, a system for detecting and responding to an attack is provided. The system includes a first device configured to receive data from a network, detect an attack based on the received data, and transmit first control information via the network. The first control information includes information indicating that an attack has been detected. The system also includes at least one second device configured to receive the first control information and limit a rate at which it forwards data.

In a further implementation consistent with the principles of the invention, a network device that includes a receiver and logic is provided. The receiver is configured to receive and forward data in a network and receive first control information from at least one other network device. The first control information indicates that an attack has been detected. The logic is configured to classify data based on at least one parameter associated with the data and limit an amount of data that is forwarded based on the classifying.

In still another implementation consistent with the principles of the invention, a network device that includes a receiver is provided. The receiver is configured to receive and forward data in a network. The receiver is also configured to receive first control information from at least one other network device, where the first control information indicates that an attack has been detected. The network device also includes logic that is configured to identify a first category of data based on at least one parameter associated with the received data and guarantee that at least a first amount of the identified data corresponding to the first category of data will be forwarded after the attack has been detected.

In yet another implementation consistent with the principles of the invention, a system for detecting and responding to an attack is provided. The system includes a first device configured to receive and forward data in a network and count an amount of received data having particular characteristics. The first device is also configured to transmit first control information via the network, where the first control information includes information representing the counted amount. The system also includes at least one second device configured to receive the first control information, generate second control information based on the first control information and transmit the second control information. The system further includes at least one third device configured to receive the second control information and limit a rate at which data is forwarded by the third device based on the second control information.

Other aspects of systems, devices, and methods consistent with principles of the invention are described herein. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

According to embodiments consistent with the principles of the invention, a firewall coordinates with elements in the network, such as network routers, to protect against attacks. Upon detecting an attack, the firewall may begin discarding packets associated with the attack. In addition, the firewall may create attack information that is sent to one or more routers in the network. The routers may rate limit the amount of data being sent to the firewall. The firewall may also dynamically adjust the rate limit information based on the amount of data being received.

The attack information includes criteria defining characteristics of packets that should be discarded because they are considered part of the attack and are therefore malicious. For example, the control packet may indicate source and destination addresses in the DOS packets. Additional information, such as User Protocol, TCP Port, etc., may also be optionally specified. In addition, the control packet may contain a time period during which the filter should be used by the router. The attack information may be sent in a control packet, for example, and may be sent using a specialized control protocol or a conventional protocol. Although the embodiments described herein use one or more control packets to transport the attack information, any data transport format and mechanism may be used, and may depend on the particular type of network the distributed filtering system is implemented in.

A router receiving a control packet may then configure itself, for example by creating new filters or modifying existing ones, to detect and discard malicious packets received by the router. These filters may be simpler than the filters required to initially detect the attack.

The cooperation between the firewall and the network routers creates a distributed filtering capability in that the identification of an attack using filters, such as complex stateful filters, occurs at a firewall or server. But the bulk of discarding of malicious packets may occur at one or more routers in the network. Because some of the filtering and discarding is offloaded to elements in the network, the firewall filter may be simpler than would be required without distributed filtering.

Figure 1:
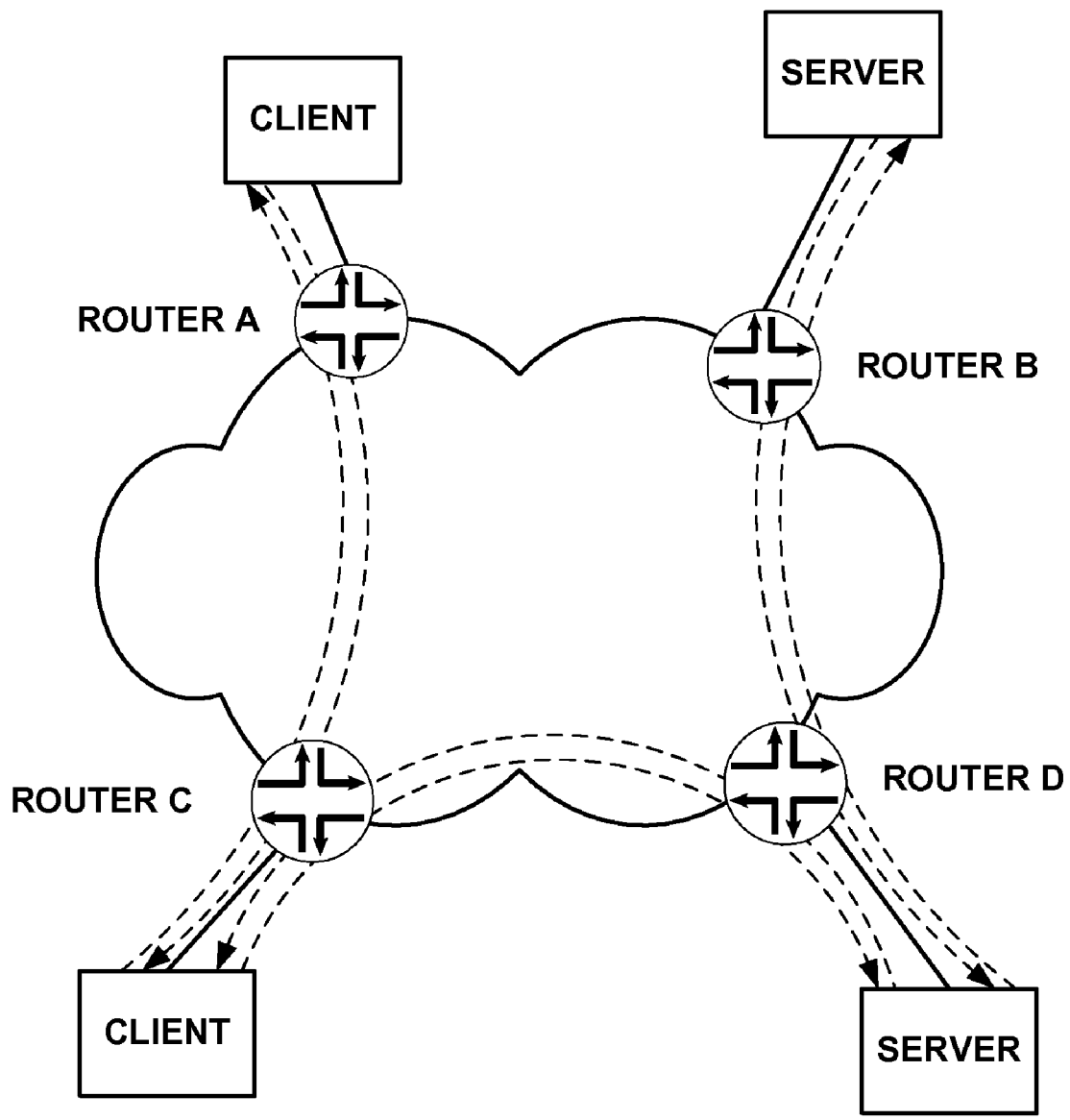
FIG. 1 illustrates various communication paths between clients and servers.
Figure 2:
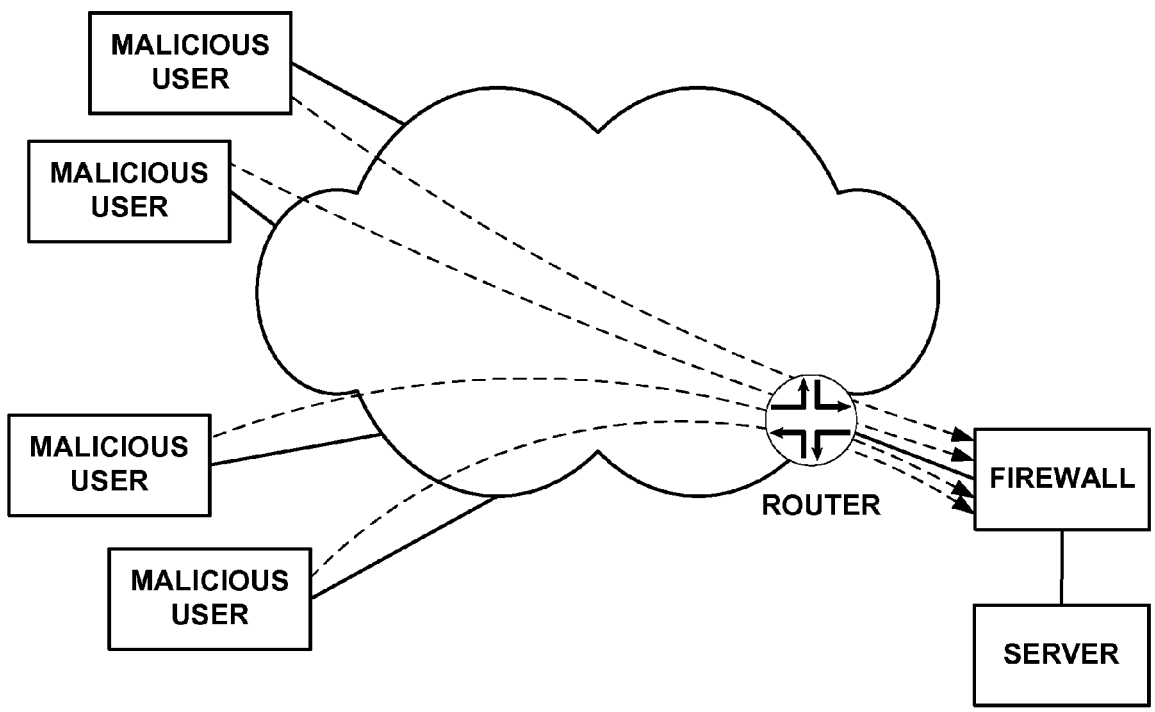
FIG. 2 illustrates an attack on a server.
Figure 3:
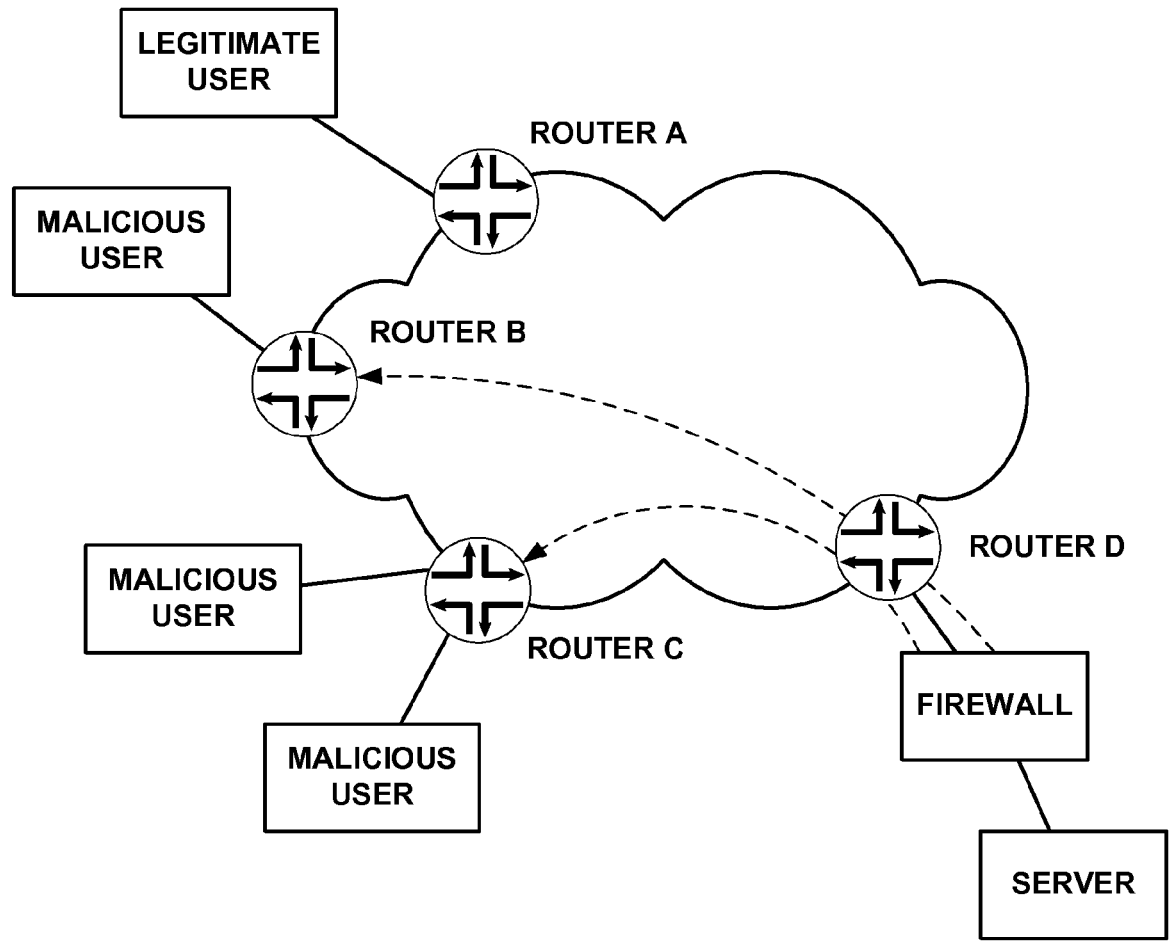
FIG. 3 illustrates a distributed filtering system consistent with the principles of the invention.

FIG. 3 illustrates an embodiment of distributed filtering consistent with the principles of the invention. An attack from one or more malicious users is initially detected at the firewall. The firewall includes attack detection elements, and responds to the attack by creating attack information and sending the attack information to routers B, C, and D in control packets, as indicated by broken line arrows in FIG. 3. Note that the source address used by the attacking systems might be legitimate, or might be made up. If the network has the ability to check the correctness of source addresses at all input points, then the source address of the attacking packets will be legitimate, and the firewall can determine where the attack is coming from, and the notification may be sent to only the ingress routers from which the attack is arriving at the network. If the network does not have the ability to check source addresses at all ingress points, then initially, when the firewall detects the attack, it is not known where the attack is coming from. In this case the message describing the attack may be sent to all ingress routers (such as routers A, B, and C in FIG. 3). If the attack packets are well distinguished from other packets, or if stopping the attack completely is important enough to justify dropping other packets as well, then the ingress routers may be told to discard all packets which match the description of the attacking packets. Otherwise, the ingress routers may be told to rate limit all packets which match the description of the attack packets. Also note that the ingress routers may also be told to count packets which match the description of the attack packets, which facilitates later analysis of the form and location of the attack.

In response to the control packets, each of routers B, C, and D (and optionally router A) configures itself to detect malicious packets based on the attack information in the control packets. Subsequent malicious packets from malicious users may then be detected by routers B, C, and D and either discarded or rate limited. Discarding some or all of the malicious packets at routers B, C, and D, greatly reduces the load on the firewall and/or server, the load on the link connecting the server to the network, and even the load on other links and elements in the network. This, in turn, significantly improves the service to legitimate users.

A similar approach can be used in any network where a firewall is protecting against unauthorized access to a network. For example, this approach may be used when a firewall protects a site of a corporate network.

Figure 4:
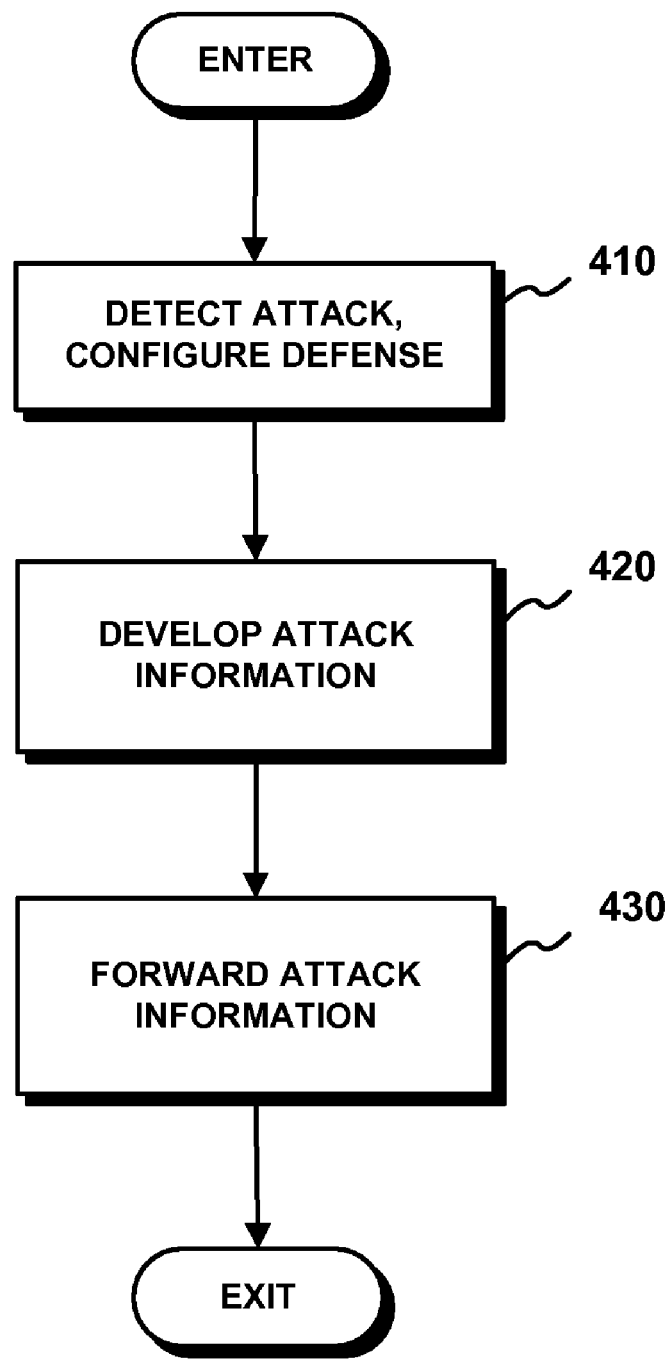
FIG. 4 illustrates a process performed by an attack detection device consistent with the principles of the invention.

FIG. 4 illustrates a process performed by an attack detection device consistent with the principles of the invention. Such an attack detection process may be used, for example, in the firewall illustrated in FIG. 3. The attack detection device first detects an attack and sets up a firewall defense configuration (act 410). The attack detection device also develops attack information based on the attack (act 420). The attack information may define some characteristic of the attack, such as a source, or a source-destination pair, or source-destination pair plus protocol field, or other characteristics. The attack detection device then forwards the attack information to devices in the network (act 430).

The attack detection device at some point may tear down the defense configuration. For example, once the routers are configured to prevent a particular attack, the attack detection device may not see additional malicious packets for that attack because the malicious packets are stopped by the routers. The attack detection device therefore will not know when the attack has ceased. Even with normal filtering, attackers could temporarily halt the attack in order to make the firewall think that the attack is over, and then restart the attack later. This problem is therefore not unique to distributed filtering.

One solution to this problem is to wait a considerable amount of time (e.g., days), and then remove the attack detection device defense configuration for a particular attack. Removal may be based on any of a number of mechanisms, such as an administrative request or expiration of a timer. If the attack is still ongoing, or if it restarts, then the attack detection device will again detect the attack, and reset the required configuration.

Also, either network operators or the attack detection device could poll the routers periodically to determine how many packets are being discovered and discarded due to any particular attack. These numbers can be compared over time to determine when the attack ends. When packets are no longer being discarded based on a particular attack, the particular configuration based on that attack may be removed. This may be checked on a periodic basis, so that after an attack has ceased there will be some amount of time before the defense configuration is removed.

Thus, the attack detection device process of FIG. 4 may be modified to include additional acts after attack information is sent to the routers. The acts may include a mechanism for tearing down the filtering configuration upon receiving an indication that the attack is over or that a period of time has elapsed.

Figure 5:
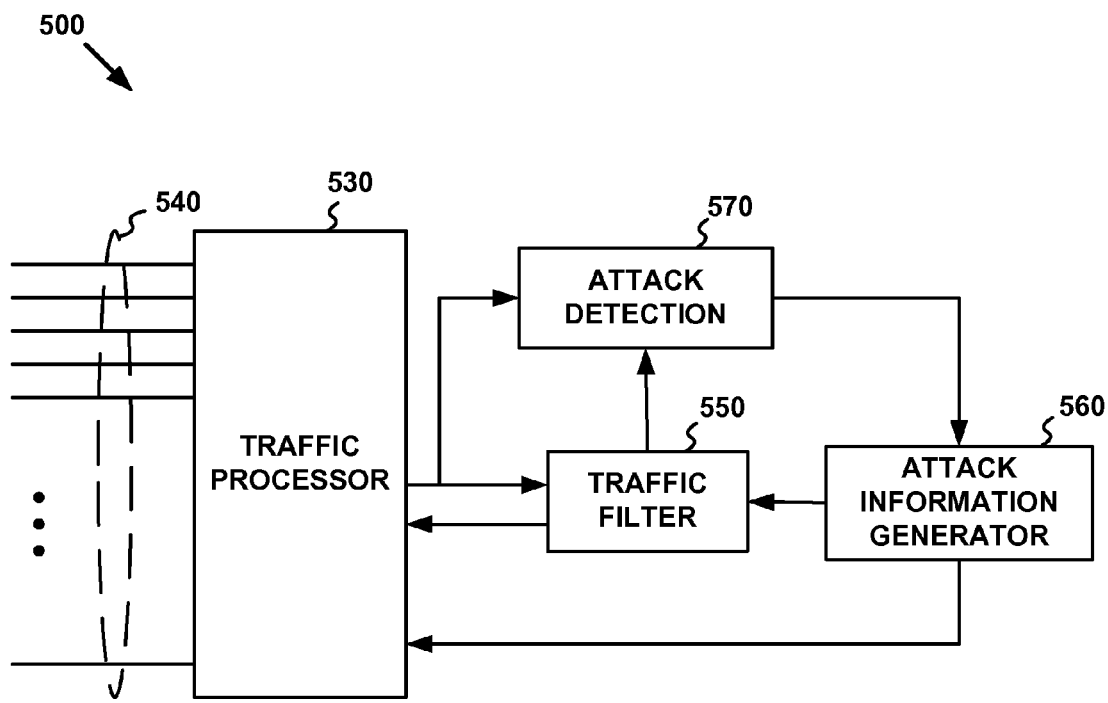
FIG. 5 illustrates an attack detection device consistent with the principles of the invention.

FIG. 5 illustrates an attack detection device consistent with the principles of the invention. The attack detection 500 may be used to perform the attack detection operations of the firewall of FIG. 3 or the process of FIG. 4. Attack detection device 500 is comprised of a traffic processor 530, a traffic filter 550, an attack detection element 570, and an attack information generator 560. Attack detection device 500 monitors incoming network traffic, detects an attack, generates attack information, and forwards the attack information out on the network to other devices. Network traffic is received and processed by traffic processor 530. In a packet network system, for example, network traffic processor 530 may strip off layer 1 and layer 2 network headers and forward the remaining information.

Input/output lines 540 connect traffic processor 530 to other entities, such as networks and devices. Traffic processor 530 receives and outputs traffic on input/output lines 540, and handles traffic processing between attack detection device 500 and the entities that attack detection device 500 is connected to via input/output lines 540.

Traffic processor 530 may forward incoming traffic to traffic filter 550 and attack detection element 570. Traffic filter 550 filters the incoming traffic and may perform filter-based operations on the traffic, such as traffic discarding and statistics gathering. Traffic filter 550 passes the filtered traffic to traffic processor 530. Traffic processor 530 may process the filtered traffic from traffic filter 550 and forward the filtered traffic out on the appropriate lines of input/output lines 540.

Traffic filter 550 sends filtering results to attack detection 570. Filtering results may include incoming traffic, information regarding the incoming traffic, and filter-based information created and collected by traffic filter 550.

Attack detection element 570 may analyze the incoming traffic and the information from traffic filter 550, and detect attacks based on the traffic, the information from traffic filter 550, or both. In response to detecting an attack, attack detection 570 sends information related to the attack to attack information generator 560.

Attack information generator 560 creates attack information based on the information from attack detection element 570. The attack information may include information defining characteristics of the attack. For example, the attack information may include information that can be used in filtering out traffic that appears to be part of a detected attack.

Attack information generator 560 may forward the attack information to traffic filter 550. Traffic filter 550 may then use the attack information to create new filters or modify existing filters to filter out traffic that appears to be part of a detected attack.

Attack information generator 560 may also forward the attack information to traffic processor 530. Traffic processor 530 may forward the attack information to one or more devices in a network, and the devices may use the attack information to filter traffic that appears to be part of the attack detected by attack detection element 570. In one embodiment consistent with the principles of the invention, traffic processor 530 sends the attack information on the network using packets, and may piggyback the attack information on a link state routing protocol.

Traffic filter 550 may also determine whether the amount of data it receives after the attack has been detected exceeds a threshold. For example, after the attack information has been forwarded, other network devices, such as routers A-D may begin filtering traffic, as described in more detail below. Traffic filter 550 may then monitor the received data to determine if the amount or rate of received data exceeds a threshold. The threshold may be associated with the processing capability of the device to which attack detection device 500 is connected, such as a server (FIG. 3) or the capacity of the link(s) between attack detection device 500 and the destination of the data. If the data exceeds the threshold, traffic filter 550 may generate a control message to be sent to the other network devices, such as routers A-D, that will instruct the other devices to further restrict the rate of data being forwarded to the firewall, as described in more detail below.

The arrows in FIG. 5 illustrate general information flow. In practice, the elements may exchange information with each other as necessary to carry out the functionality of attack detection device 500. FIG. 5 illustrates particular elements relevant to embodiments consistent with the principles of the invention. Other elements may be included. For example, attack device 500 may be a standalone device or may be included in another device. Moreover, attack detection device 500 may be used in a firewall, such as the firewall illustrated in FIG. 3. In embodiments consistent with the principles of the invention, traffic filter 550, attack detection 570, and attack information generator 560 may be implemented as one or more separate elements and may be implemented entirely in hardware, entirely in software, or in both hardware and software.

Figure 6:
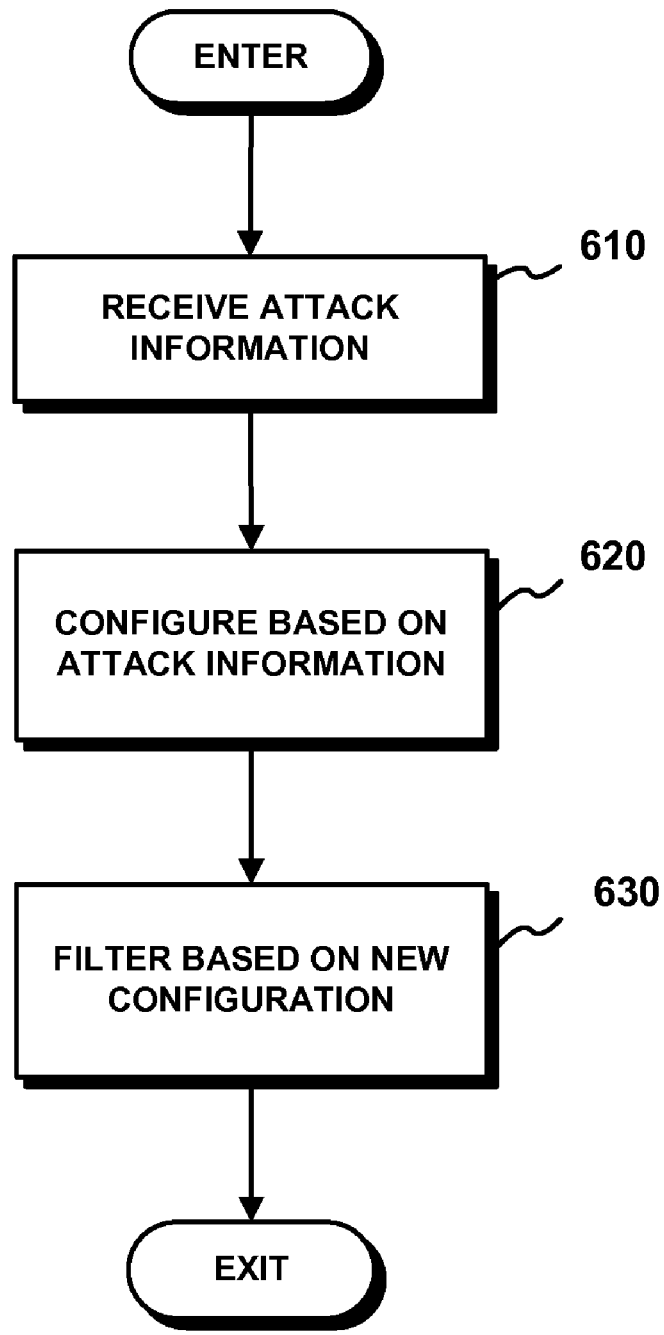
FIG. 6 illustrates a process performed by a router consistent with the principles of the invention.

FIG. 6 illustrates a process performed by an attack response device. The attack response device 720 (FIG. 7) may be used in a network device, such as router B of FIG. 3. Attack response device 720 receives the attack information in control packets from an attack detection device (act 610), such as device 500, and configures itself based on the attack information (act 620). Configuring may include, for example, creating a filter or configuring an existing filter based on the attack information. The router then proceeds to detect and discard malicious packets based on the new configuration (act 630).

In addition to discarding or rate limiting malicious packets, attack response devices may also perform other monitoring of an attack, such as counting the number of discarded or malicious packets. The monitoring information may be used in subsequent analysis of an attack. Analyzing the attack may include, for example, identifying the source of the attack. Attacks may be initiated by one device and carried out by others. In such cases, the initiator does not necessarily correspond to the source address in the malicious packets, since an invalid source address might have been used. The attack response device may send the information regarding the attack back to the firewall for further analysis.

Thus, the router distributed filter configuration process of FIG. 6 may include additional acts, such as monitoring attacks and communicating with the firewall regarding ongoing issues with the attack.

Figure 7:
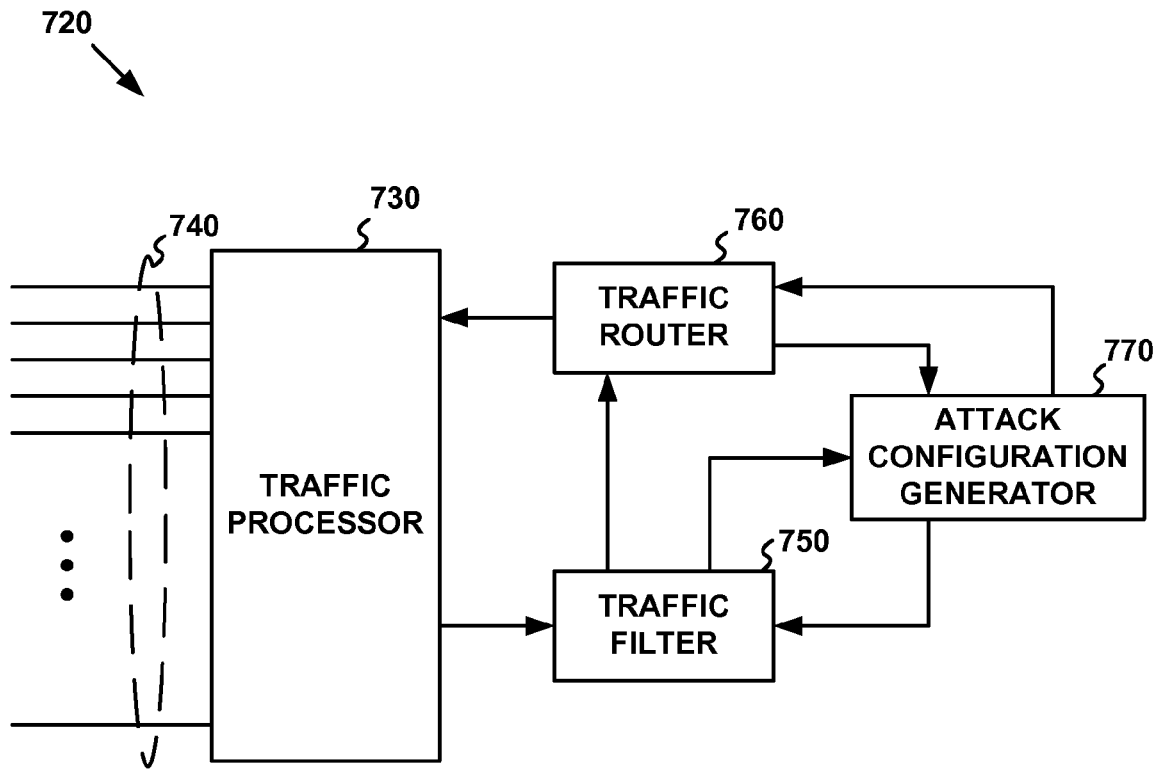
FIG. 7 illustrates an attack response device consistent with the principles of the invention.

FIG. 7 illustrates an attack response device consistent with the principles of the invention. The attack response device 720 may carry out the malicious packet detection and discard operations described with respect to FIG. 3. For example, attack response device 720 may be used in a network device, such as routers A, B, and C of FIG. 3. Attack response device 720 may also carry out the process described with respect to FIG. 6. Attack response device 720 comprises a traffic processor 730, a traffic filter 750, a traffic router 760, and an attack configuration generator 770. Attack response device 720 receives attack information and creates or configures existing filters so that the filters detect and discard traffic that appears to be part of an attack.

Traffic processor 730 receives traffic from input/output lines 740 and outputs traffic on input/output lines 740. Traffic processor 730 may process incoming traffic and forward the incoming traffic to traffic filter 750.

Traffic filter 750 filters the incoming traffic. Traffic filter 750 is connected to traffic processor 730, traffic router 760, and attack configuration generator 770. Filtering may include any type of conventional filtering operation, such as discarding network traffic, collecting statistics, and modifying bits in the network traffic if certain criteria are met. Some of the information developed by traffic filter 750 may be sent to attack configuration generator 770. Traffic filter 750 forwards traffic that is not discarded to traffic router 760.

In implementations consistent with the principles of the invention, traffic filter 750 may classify received traffic into one or more categories and filter the received traffic based on its particular category, as described in more detail below. Traffic filter 750 may classify a data packet as being in a particular one of the categories based on one or more parameters or characteristics associated with the data packet.

For example, traffic filter 750 may categorize data packets based on information contained in the IP header of the data packet. Such information may include the source address, destination address, class of service, length and protocol associated with the data packet. The information may also include information in a transmission control protocol (TCP) header or user datagram protocol (UDP) header, such as a port number. Traffic filter 750 may categorize packets based on one or more of these or other parameters associated with the packets. For example, data packets having a particular source address/destination address pair may be included in a first category. Data packets having a particular protocol field value or a particular class of service field value may be included in a second category. Data packets having other values in particular fields or combinations of fields may be grouped in other categories. In addition, data packets not having the particular characteristics associated with one of the categories may be classified in a general category. In summary, traffic filter 750 may be configured to identify any particular field, combination of fields or other characteristic(s)/parameter(s) associated with a data packet and categorize the data packet into one of the predefined categories.

Traffic filter 750 may then filter the traffic in each category based on a particular rate limit associated with the corresponding category. For example, traffic filter 750 may be preconfigured to store the rate limit information prior to an attack being detected. The rate limit information may be different for one or more of the categories of traffic. Alternatively, traffic filter 750 may receive the rate limit information from another device, such as attack detection device 500, along with that attack information indicating that the attack has been detected (FIG. 6, act 610). In either case, once attack response device 720 is notified of the attack, traffic filter 750 may begin filtering data traffic based on the particular rate limits. Traffic filter 750 passes an amount of data that does not exceed the rate limits for each category to traffic router 760. Traffic filter 750 may drop packets that exceed the rate limits for each category of data. Traffic router 760 may then forward the data received from traffic filter 750 to traffic processor 730 for output via the appropriate input/output lines 740.

In other implementations consistent with the principles of the invention, traffic filter 750 may be configured to filter traffic prior to an attack being detected. In this case, the stored rate limit information may be set to relatively high values for each category of data so that under non-attack situations, all or substantially all of the received data is forwarded to its destination. When an attack occurs, however, the traffic filter 750 may begin filtering potential attack traffic prior to being notified of the attack by another device.

Traffic filter 750 may also receive rate limit adjustments from another device, such as attack detection device 500, and adjust the rate limits for each category accordingly. For example, if attack detection device 500 determines that the received data exceeds the processing capability of the server or router to which the data is destined, attack detection device 500 may adjust the rate limits accordingly. For example, if the destination device coupled to attack detection device 500 (e.g., the server in FIG. 3) is overloaded by a factor of two, attack detection device 500 may send information to attack response device 720 indicating that the rate limits for each of the categories of data should be cut by 50%. Attack response device 720 may then filter the received data based on the updated rate limits. That is, traffic filter 750 may adjust its filtering based on the updated rate limits. Attack detection device 500 may continue to monitor the received data and dynamically adjust the rate limits in this manner to ensure that the server or other device(s) coupled to attack detection device 500 (or their corresponding link(s)) are not overloaded.

Traffic router 760 is connected to traffic filter 750, traffic processor 730, and attack configuration generator 770. Traffic router 760 determines which of input/output lines 740 the network traffic should be sent out on, and forwards the traffic to traffic processor 730. In embodiments consistent with the principles of the invention, attack response device 720 may use any one of a variety of traffic processing techniques. For example, traffic router 760 may receive actual traffic, such as packets, from traffic filter 750, or simply a representation of the traffic, such as packet header information. In the latter implementation, traffic processor 730 may buffer the traffic data until receiving information from traffic router 760 regarding where the traffic data should be routed.

Some of the network traffic received by traffic router 760 may include attack information. Traffic router 760 forwards this traffic to attack configuration generator 770.

Attack configuration generator 770 receives the attack configuration information from traffic router 760 and the filter information from traffic filter 750, and develops attack configuration information. The attack configuration information defines characteristics of an attack that is used by traffic filter 750 to create new filters or modify existing filters, or both. Attack configuration generator 770 may also monitor ongoing attacks based on information received from traffic filter 750.

Attack configuration generator 770 may also send information regarding an attack to traffic router 760, which forwards the information to traffic processor 730 for output on input/output lines 740. This allows attack related information to be sent to other devices on the network. For example, the original attack information, or other attack information generated by attack configuration generator 770, or both, may be forwarded to one or more other attack response devices, such as attack devices in other routers in the network. The attack information or newly generated attack information may also be sent back to the originator of the attack information, such as a firewall.

The arrows in FIG. 7 illustrate general information flow. In practice, the elements may exchange information with each other as necessary to carry out the functionality of attack response device 720. FIG. 7 illustrates particular elements relevant to embodiments consistent with the principles of the invention. Other elements may be included. For example, attack response device 720 may be a standalone device or may be included in another device. In embodiments consistent with the principles of the invention, traffic filter 750, traffic router 760, and attack configuration generator 770 may be implemented as one or more separate elements and may be implemented entirely in hardware, entirely in software, or in both hardware and software.

Transmitting Attack Information

The firewall may send attack information to a router using a signal, one or more bits, fields, or packets, or some combination of these. The attack information may be sent using protocols typically used to configure routers, such as SNMP, HTTP/HTML, or XML.

To optimize distributed filtering, it may be desirable to discard packets at some distance from the server being attacked. Discarding malicious packets close to the source minimizes the need to carry malicious packets through the network. Also, it is desirable to discard various streams of malicious packets before the streams merge into a large stream, to reduce the likelihood of congestion in parts of the network.

To discard malicious packets close to their source, a firewall may advertise the attack information to routers throughout a network. In general, this requires flooding the attack information to multiple routers. A special-purpose flooding mechanism may be used for advertising the information. Special-purpose flooding mechanisms, however, can be complex to design, implement, test, debug, and deploy.

Advertising attack information in the network may be achieved without designing a special-purpose flooding mechanism. Commonly deployed link state routing protocols, such as OSPF or IS-IS, often include a reliable way to flood information throughout a network or area. Link state routing protocols are used by routers to exchange information regarding network topology among routers so that each router can compute paths to destinations within the network and to destinations outside the network. The link state information is advertised by the routers by flooding the network with link state packets.

A link state routing protocol can be thought of as divided into three clear phases:

(1) Hello: Each router exchanges packets with its immediate neighbors in order to determine and verify its local topology.

(2) Flooding: Each router creates an advertisement, or series of advertisements, which completely describe its local topology, and then floods these advertisements in a reliable fashion to other routers in the network. As a result of this phase, all routers in the network or within an area of the network have a complete and identical map of the topology of the network or area.

(3) Route computation: Each router runs a route computation on its map of the network (or area) in order to compute paths.

In embodiments consistent with the principles of the invention, attack information may also be distributed in the routing packets, such as link state routing packets (such as IS-IS, OSPF, or PNNI) or path vector routing packets (such as BGP). Thus, attack information may be piggybacked on conventional link state routing information. For example, the "Link State Packets" (used in IS-IS) or "Link State Advertisements (LSAs)" (used in OSPF) may be used to distribute the attack information.

With IS-IS, a new "Type/Length/Value" (TLV) triplet contained within a link state packet may be used to carry the attack information. With OSPF, a new "Opaque Link State Advertisement" may be used. IS-IS and OSPF have the capability to carry various forms of information in this manner. Therefore, in embodiments consistent with the principles of the invention, TLVs and/or Opaque LSAs may be used specifically for the purpose of carrying attack information.

Conventional firewalls and servers typically do not participate in the operation of routing protocols and therefore are not configured to handle link state routing protocols. Firewalls consistent with the principles of the present invention, however, may insert attack information in the link state routing information. Inserting attack information in the link state routing information may be accomplished in several ways. Three examples of inserting attack information are given below: proxy operation, send only operation, and full routing operation.

1. Proxy Operation

With proxy operation, the firewall detects an attack, develops attack information defining characteristics of the attack, and sends the attack information to one local router, or a small number of local routers, describing which packets need to be discarded (e.g., which filters need to be turned on or reconfigured in the routers). The local router or routers then acts as a proxy to other routers, and sends this information in link state information to other routers. For example, the attack information may be included in Link State Packets (IS-IS) or Link State Advertisements (OSPF). A simple protocol may be used for transmitting the attack information between firewalls and routers, and may use existing protocols, such as SNMP or HTTP/HTML.

Proxy operation has several advantages. It avoids adding the firewalls to the set of systems taking part in the operation of the routing protocol, and it avoids other complications, discussed in greater detail below.

Figure 8:
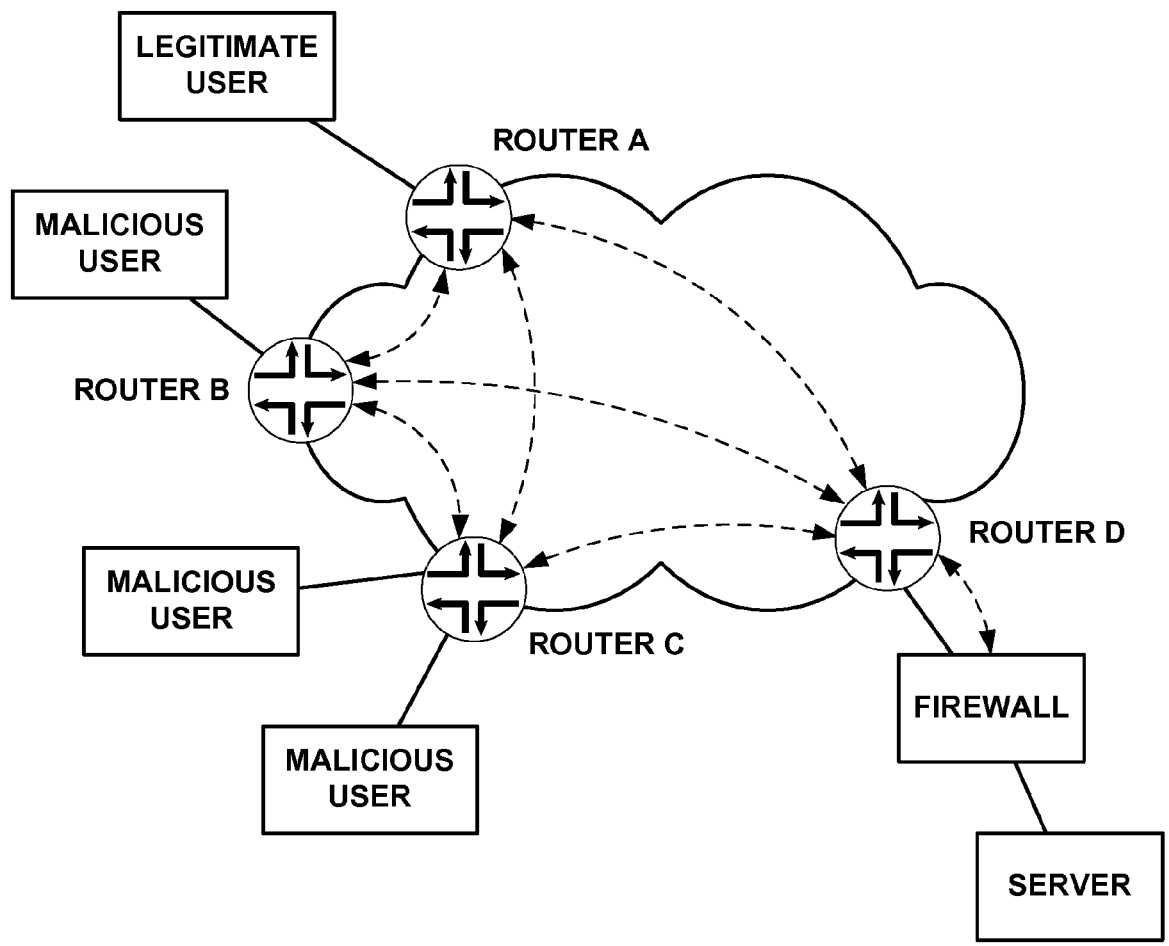
FIG. 8 illustrates piggybacking on link state routing with proxy.

FIG. 8 illustrates piggybacking attack information on link state routing information using proxy operation. The firewall detects an attack, and sends attack information to router D. Router D includes the information in link state information that is sent to routers A, B, and C. Routers A, B, and C, may in turn include the attack information in link state information forwarded to other routers in the network.

2. Send Only Operation

With send only operation, a firewall or server participates in the operation of the link state protocol, and sends information specifying attack information that it wants routers to use. The firewall or server, however, does not maintain link state information from other systems.

3. Full Routing Operation

With full routing operation, the firewall participates as a normal node in the operation of the link state routing protocol.

Figure 9:
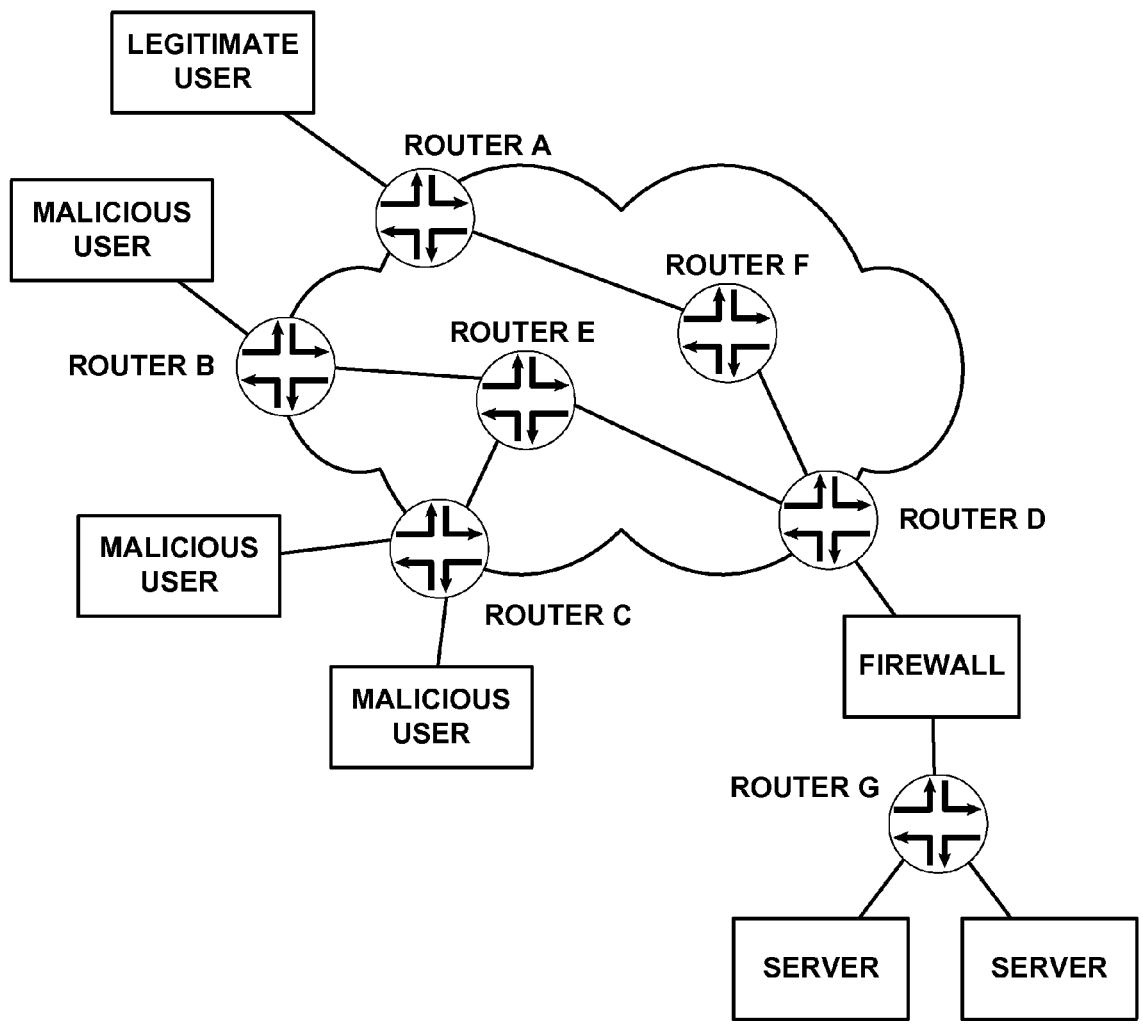
FIG. 9 illustrates use of a firewall between routers.

FIG. 9 illustrates use of a firewall between routers. In FIG. 9, there is a firewall between router D and router G. In this topology, router D will normally be running a routing protocol directly with router G. The firewall would then normally be invisible to the routing protocol.

If router D and router G use routing protocols to carry attack information, then the particular way this is implemented depends on the method used to insert attack information into the routing protocols. For example, carrying attack information using the proxy operation, send only operation, and the full routing operation, will be implemented in different ways.

If proxy operation is used, then there is little complexity. The firewall exchanges control information with either router D or router G, or both. The router will then insert the appropriate information into link state information.

If send only operation is used, then the firewall will transmit information using the link state routing protocol, but will not receive routing information. With this approach, router D and router G will need to continue to operate as normal routing neighbors. This implies that router D or router G should have two logical interfaces on one physical interface. For example, router D may have an interface to both the firewall and router G on the same physical interface. Fortunately, this is very similar to current operation over local area networks (LANs)—a router may have interfaces to multiple other routers over the same LAN. The send only operation may therefore be used with conventional routers and conventional routing protocols over LAN interfaces.

If full routing operation is used, then the firewall participates in the operation of the routing protocol as if it is a normal router. The firewall may then be thought of as a normal router which has only two interfaces, but which has additional capability, such as attack detection and definition of attack information.

Router Configuration and Rate Limiting

Configuration of the router based on the attack information from the firewall may require creating a new filter or modifying an existing one. Several particular situations may arise in configuring the router.

In many cases attacks consist of a large number of a certain type of communication, such as transmission control protocol synchronization (TCP SYN) packets. In some cases, therefore, the attack information from a firewall that is applied by routers may include information defining the type of packets being sent, and may, for example, specifically discard or rate limit packets of a certain kind, such as TCP SYN packets. In the case that additional attacks develop, the attack information may be defined by the firewall in a way that is specific to the types of packets used in these other attacks.

One advantage of distributed filtering is that it protects against congestion in network resources between the firewall and the routers participating in the distributed filtering operation. Preventing congestion does not, however, necessarily require that all packets be discarded. Also, discarding all packets may have the unfortunate effect of inadvertently discarding valid packets (i.e., packets from legitimate users) along with the malicious packets. In some cases this might occur even after the attack has stopped, or in a part of the network where the attack has been stopped or where the attack has never occurred.

As described above, rate limiting may be used with distributed filtering. That is, one or more routers may classify packets into a number of categories. The router will then determine, using filters for example, how many packets belong to each category and will discard packets from each category if the amount of traffic for that category exceeds a defined threshold. If an attack persists, this implies that the router will discard some, and possibly most of the malicious packets. Some packets, however, will be allowed to pass. In some implementations, the rate limits for each router are chosen to be small enough so as not to cause excessive congestion in the network. In other implementations, the rate limits may be set to be fairly large, since most sources will not be sending data at all times. However, if all the sources are sending large amounts of data, such as during an attack, the amount of data that the firewall receives may overwhelm the firewall and/or the server.

In general it may be difficult to precisely set the rate limits such that attack traffic is sufficiently filtered while also allowing legitimate traffic to be forwarded on to its destination. If the limits are set too low, then legitimate traffic may be discarded even in the absence of an attack and the server may be under-utilized. However, if the limits are set too high, then when an attack occurs, the total traffic arriving at the server may overwhelm the server.

In accordance with an exemplary implementation consistent with the principles of the invention, the rate limits may be dynamically adjusted. For example, as discussed above, either a priori or when an attack occurs, distributed filters may be set to limit the traffic passing each filtering router to a certain rate. After the attack has been detected, the original rate limits may be modified based on the amount of received attack traffic and other non-attack traffic, as described in more detail below.

Figure 10:
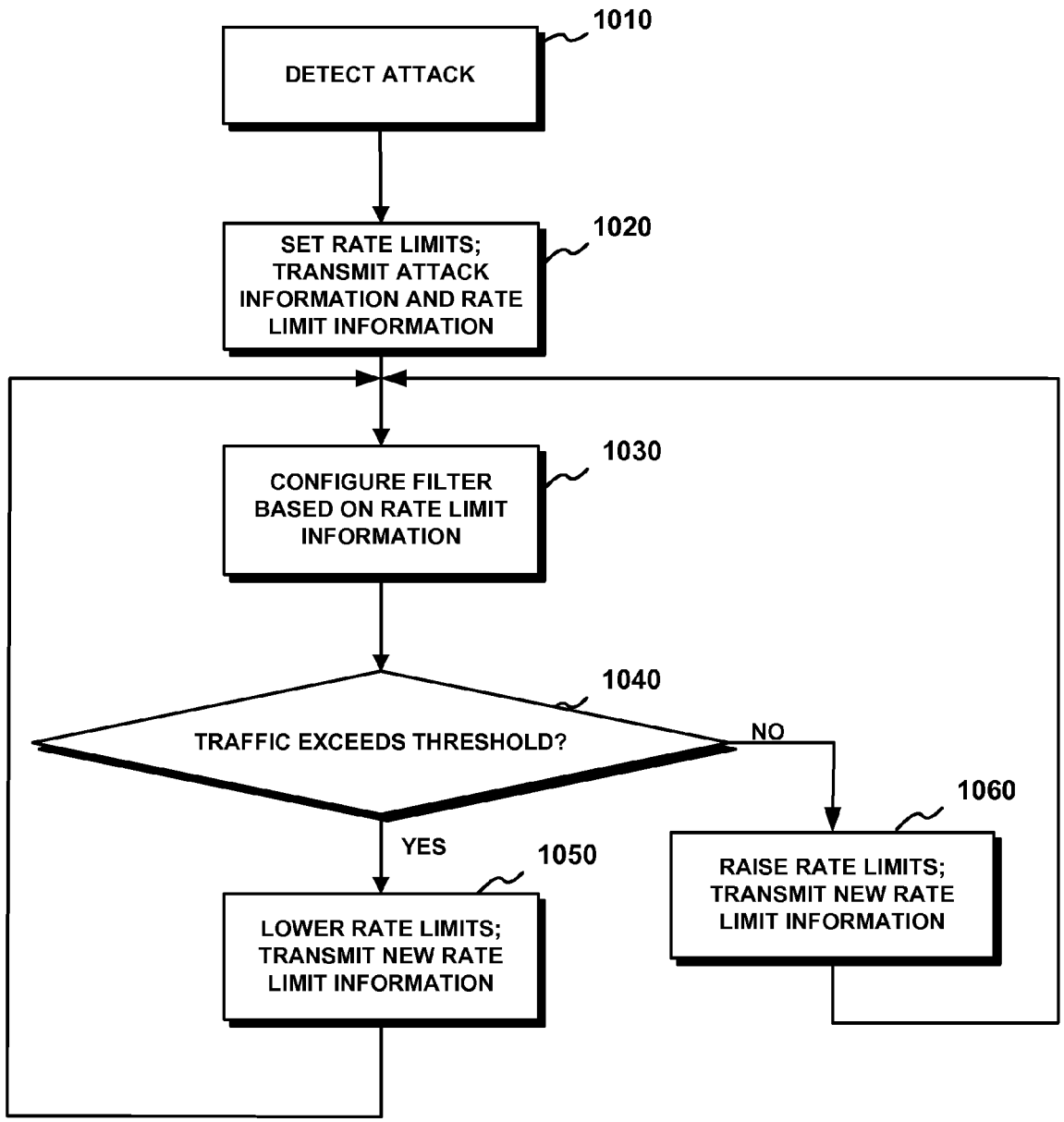
FIG. 10 illustrates exemplary processing associated with rate limiting traffic consistent with the principles of the invention.

FIG. 10 is an exemplary flow diagram illustrating dynamically adjusting the rate limits consistent with principles of the invention. Processing may begin when an attack is detected (act 1010). As described previously with respect to FIGS. 4 and 5, attack detection device 500 may detect the attack and generate attack information that defines one or more characteristics of the attack traffic. The description below assumes that attack detection device 500 (FIG. 5) is implemented in a firewall, such as the firewall of FIG. 3. Attack detection device 500 may also be implemented in other network devices, such as a router, a server or an intrusion detection system. After an attack is detected, the firewall may set rate limits for various types of traffic (act 1020). The rate limits may be different for one or more of the categories. For example, one or more categories may be considered to be high priority categories and may have higher rate limits than other categories.

The firewall may send the rate limit information and the attack information to one or more routers in the network (act 1020). In one implementation, the firewall may send the rate limit information along with the attack identification information. For example, referring to FIG. 3, the firewall may send the attack and rate limit information to router D. Router D may then forward the attack and rate limit information to other routers in the network, such as routers A, B and C. Alternatively, the firewall may broadcast the information to all routers in the network.

As described above, in some implementations, the routers may be preconfigured to store the rate limit information prior to an attack being detected. In this case, the firewall may not have to send the original rate limits and may just send the attack information to the router(s).

In either case, the routers, such as routers A-D, receive the attack information and may then configure their filters based on the rate limit information (act 1030). The routers may then filter received traffic based on the rate limits. As described previously, in implementations in which the routers are preconfigured with the rate limit information, these routers may filter traffic based on the preconfigured rate limits prior to the attack being detected. In this case, the rate limits may be set to be relatively high such that substantially all of the traffic is forwarded.

After the attack begins and the routers begin filtering the data, the total amount of data received by the firewall (e.g., the total bandwidth summed across all filtering routers) may exceed the maximum capacity which can be adequately handled by the firewall and/or the server to which the data is destined. The firewall may then determine whether the arriving traffic exceeds a predetermined threshold (act 1040). The predetermined threshold may be associated with the capacity and processing capability of the firewall itself, the processing capability/capacity of the device to which the data is destined (e.g., the server in FIG. 3), and/or the capacity of the link(s) between the firewall and the destination device. If the firewall determines that the arriving traffic is more than the predetermined threshold, the firewall may lower the rate limits (act 1050).

For example, the firewall may determine that the amount of received data is two times the predetermined threshold. In this case, the firewall (e.g., traffic filter 550) may send control information to the routers indicating that the rate limit for each of the categories of data should be cut in half. In alternative implementations, the control information may indicate that rate limits for various categories should be cut by a certain amount, while other categories may be cut by other amounts. In this case, the firewall may analyze the received data and the rates for the particular categories to determine the appropriate rate limit adjustments that may be necessary. The firewall may then send control information to routers A-D indicating that the rate limits for the specified categories of data are to be reduced. In some implementations consistent with principles of the invention, the control information may specify a new rate for packets of one or more categories. In other implementations, the control information may indicate that the previous rate limits for one or more categories are to be cut by a predetermined amount, such as a fixed percentage. For example, if the firewall is overloaded by a factor of two, the control information may indicate that the previous rate limits are to be cut in half. Routers A-D may then adjust their filters in accordance with the new rate limit information. In this manner, routers A-D will reconfigure their filters (e.g., traffic filters 750) and begin forwarding fewer packets to the firewall.

If the firewall determines that the arriving traffic is significantly less than the predetermined threshold, the firewall may send control information to routers A-D that specify that the rate limits may become less strict, i.e., the rate limits may be increased (act 1060). For example, if the received traffic is 25% less than the predetermined threshold, the control information may indicate that the routers may increase the rate limits by, for example, 20%. In some implementations consistent with the principles of the invention, the control information may specify a new rate for packets of one or more of the data categories. In other implementations, the control information may indicate that the previous rate limits may be increased by a predetermined amount, such as a fixed percentage. Routers A-D may then adjust their filters in accordance with the new rate limit information. In this manner, routers A-D may reconfigure their filters (e.g., traffic filters 750) and begin forwarding more packets to the firewall.

The process may then be repeated and the firewall may continue to dynamically adjust the rate limits for the various categories of data based on the received traffic. If the attack subsides in a part of the network, a router in that part of the network will find that the number of packets passing through the filter (i.e., legitimate user packets because the attack has ended in that part of the network) is small enough that the threshold is not passed. In this case, the packets will be forwarded, and legitimate users can therefore obtain proper delivery to their destination.

After the attack subsides, the firewall may send information to routers A-D indicating that the attack is over. Routers A-D may then reconfigure their filters to stop filtering traffic intended for the firewall.

In this manner, the firewall may dynamically adjust the rate limits for one or more categories of data traffic in an attempt to counter an attack. In some implementations consistent with principles of the invention, traffic which is identified as originating a new session to a server (such as packets containing a TCP SYN packet) may define a separate category and may be rate limited more stringently than traffic which is part of existing sessions. This is because traffic associated with originating a new session may consume more resources of the destination device (e.g., the server in FIG. 3) or the routers and may be more likely to be part of the attack.

In other implementations consistent with principles of the invention, certain types of packets may be identified and categorized as "good" packets. The routers may be configured to guarantee bandwidth for the good packets, as described in more detail below.

Figure 11:
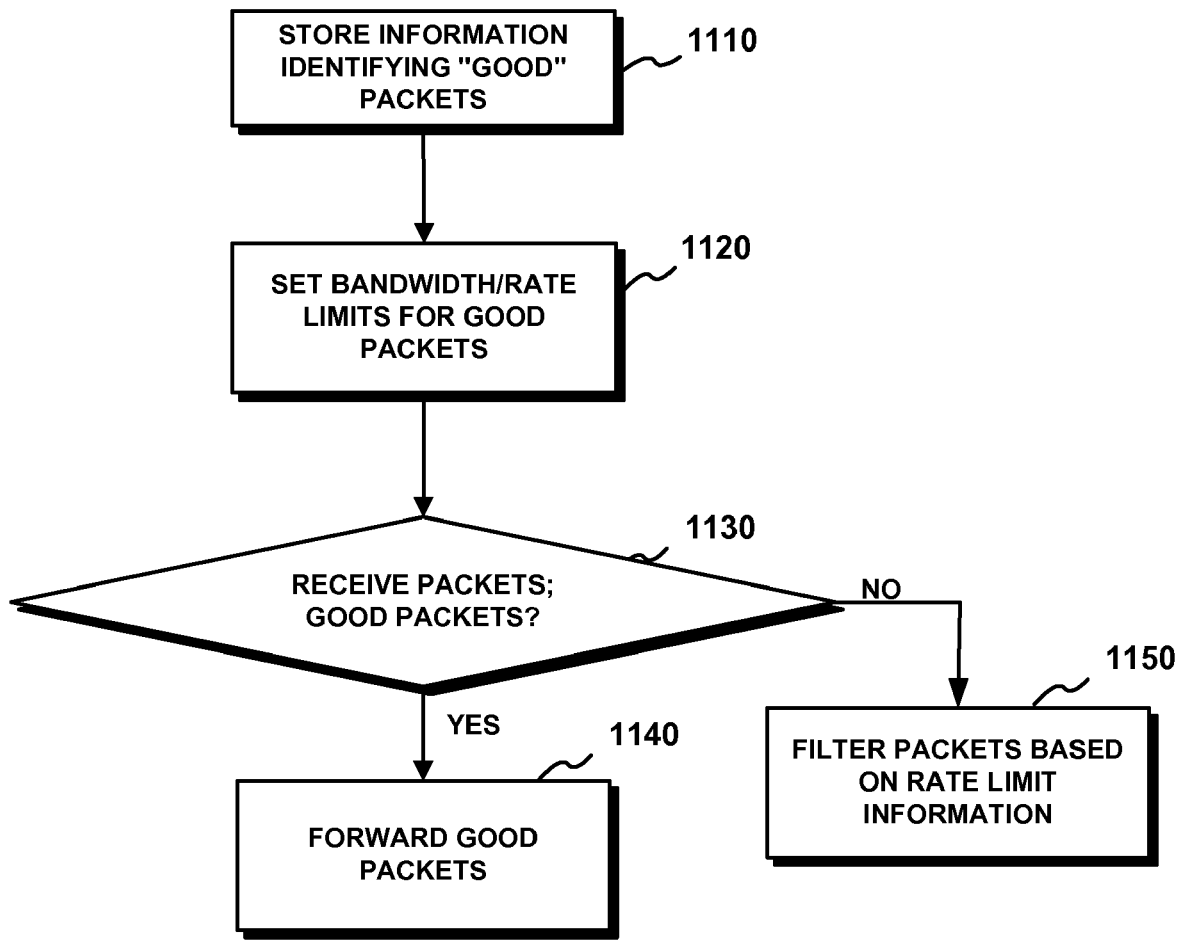
FIG. 11 illustrates exemplary processing associated with certain packets consistent with the principles of the invention.

FIG. 11 is an exemplary flow diagram illustrating processing associated with "good" packets consistent with principles of the invention. Processing may being by storing information identifying certain types of packets, referred to as "good" packets (act 1110). For example, packets identified as being routing protocol traffic from a known peer router may be categorized as good packets. As another example, packets identified as originating from a trusted source, such as from a central management facility, may be categorized as good packets. Other packets may also be identified as good packets in implementations consistent with the principles of the invention based on the particular user requirements.

The routers may be configured to guarantee bandwidth to these good packets and not rate limit the good packets (act 1120). Alternatively, the rate limits for good packets may be set to a high rate such that all or nearly all of the good packets (e.g., 99% or more) are forwarded. The rate guarantees for the good packets may be done a priori and may be prestored by the routers. Alternatively, the rate guarantees may be set by the firewall based on the amount of received traffic and may be forwarded to the routers.

In either case, when a router receives a packet, the router determines whether the packet is a good packet (act 1130). If the packet is a good packet, the router forwards the packet in accordance with the bandwidth guarantee or rate limit information for good packets (act 1140). As discussed above, the bandwidth or rate limit may be set such that all or substantially all good packets are forwarded to their destination and few, if any, of the good packets are dropped. In this case, if the attack traffic happens to have the same characteristic(s) as the good traffic, the attack traffic may also be forwarded. The firewall, however, may adjust the guaranteed bandwidth in a similar manner as other traffic in the manner described with respect to FIG. 10.

The descriptions of packets used for filters may in some cases include multiple similar packets in the same filters. In some cases, when considering the pre-configured filters, the attack packets may have characteristics which cause them to match the same filter as good packets. However, additional characteristics of the attack packets, which were not originally considered in the pre-configured filter, might allow them to be distinguished from good packets. In this case, an additional filter may be defined to distinguish the attack packets from the good packets, and the attack packets may then be discarded or rate limited separately from the good packets.

If the router determines that the packet is not a good packet, the router filters the packet based on the rate limit information associated with particular category of data packet (1150). That is, the router filters the packet based on the particular category in which the data packet is classified, as described above with respect to FIG. 10.

After a router has been configured to detect and drop malicious packets, it may be useful to remove the configuration. Generally speaking, a given attack will continue for only a limited period of time. Removing the configuration may be easy to do when link state routing is used to transfer the attack information. Link state routing protocols already have methods to flush information. For example, a given Link State Advertisement (OSPF) or Link State Packet (IS-IS) can be "flushed" (and announcement can be flooded indicating that the LSA or LSP no longer exists), or a replacement LSA/LSP can be flooded containing new information (or even containing no information if desired).

Preventing Malicious Filter Configuration

An attacker who learns how the attack information is sent to configure routers in the network may attempt to maliciously configure the routers by sending fabricated attack information. In response to the fabricated attack information, a router will incorrectly configure itself to filter packets that are not actually malicious, but are defined to be malicious by the fabricated attack information.

To prevent this, the firewall filter may make use of strong authentication and/or encryption techniques. For example, IP Security (IPSec) may be used. IPSec is a tunneling protocol for setting up paths between network devices, such as paths between a firewall or server and a router. IPSec provides a method of authentication and/or encryption and protects data in transit from eavesdropping and attacks. IPSec also uses cryptography to protect communications on links between devices. Other security measures may also be used between the firewall and the routers to prevent attackers from surreptitiously turning on filters.

Central Management Embodiment

Figure 12:
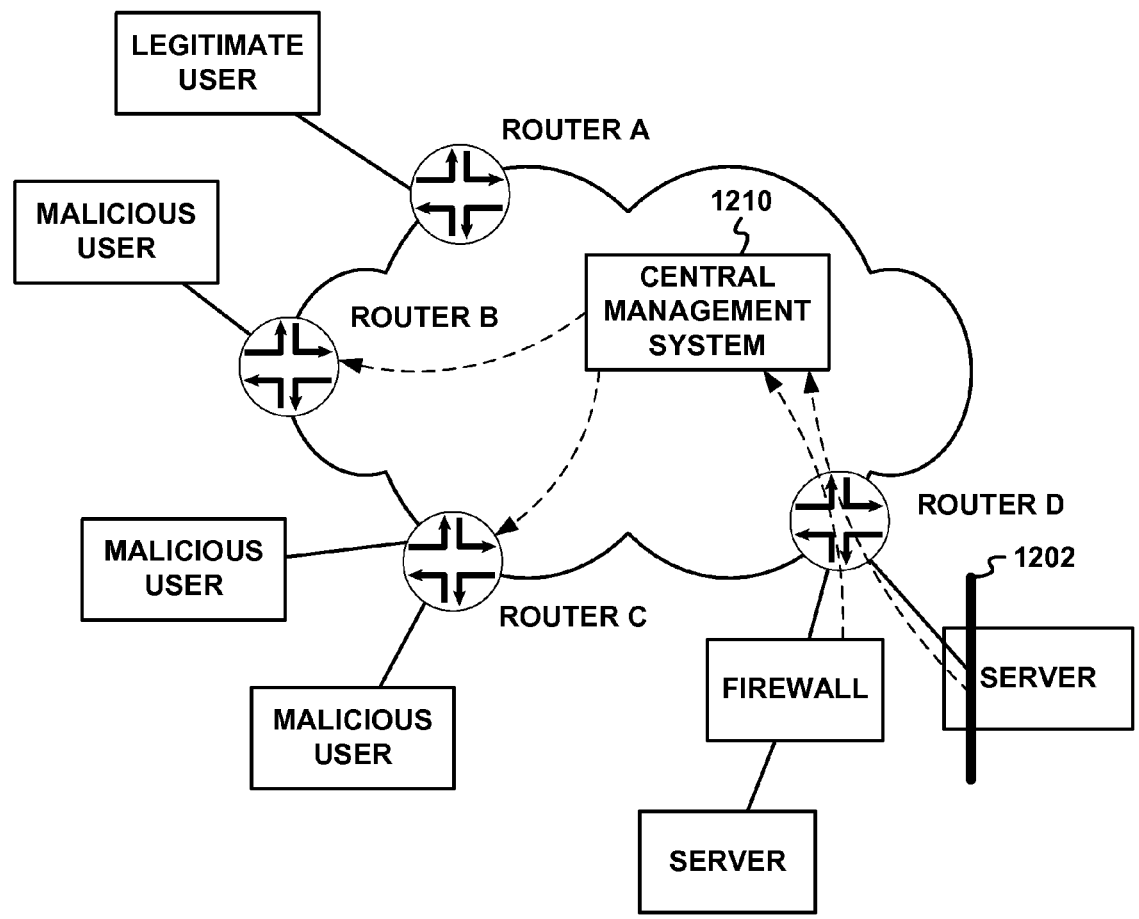
FIG. 12 illustrates a network consistent with the principles of the invention using a central management system.

FIG. 12 illustrates a distributed filtering system using a central management system consistent with the principles of the invention. The distributed filtering system of FIG. 12 includes a physically separate firewall as well as a server configured with a firewall 1202. Each firewall participates in detecting an attack. In response to detecting an attack, or some sort of indication of an attack, each firewall creates attack information defining what has been detected regarding the attack, and sends the attack information to router D and central management system 1210. The attack information may come from one or both of the firewalls.

Central management system 1210 receives the attack information and uses the information to assist in coordinating a response to the attack. For example, central management system 1210 may forward the attack information directly to routers B and C, the routers connected to malicious users. Central management system 1210 may also analyze the attack information and develop alternative attack information that is forwarded to routers B and C. Central management system 1210 may also collect information from routers indicating the number of packets and/or bytes which have been found to match the filters. For example, this might include the number of packets which have been discarded due to filters, or the number of packets which have been found to match the rate limits which have been set in routers.

Central management system 1210 may also receive information from a router, such as router D, or a firewall, such as firewall 1202, indicating an amount of data that matches the attack characteristics. For example, a router or firewall may count a number of packets and/or bytes that match the attack characteristics, such as packets having a particular source address-destination address pair, a particular protocol field value, a particular TCP SYN field value, etc. The router or firewall may then forward this information to central management system 1210. Central management system 1210 receives this information and may store or log the data in a memory. The log may store historical data associated with monitoring data traffic on the network. Central management system 1210 may also present information associated with the received data to a network operator responsible for monitoring the network. The information may be presented as an alert based on the received count information that indicates the number of packets/bytes that correspond to attack data.

For example, if the attack-related count is relatively high, central management system 1210 may provide an audible and/or visual alert to the network operator indicating that action must be taken based on the received count information. The network operator may then enter commands to central management system 1210 to respond to the attack. The commands may be based on the received count value associated with attack data. Alternatively, central management system 1210 may be pre-configured to automatically provide commands based on the received attack information. In either case, the commands may also be based on historical data associated with the network and configuration data associated with the network. The historical and configuration data may include information gained from managing and responding to previous attacks.

Central management system 1210 may then forward this attack response information to other devices, such as routers A-D and firewalls, indicating the appropriate response. The attack response information may include rate limit information associated with rate limiting one or more categories of traffic, as described above with respect to FIG. 10.

Central management system 1210 may also received updated count information representing attack-related data from the other network devices. The updates may be received at predetermined intervals. Central management system 1210 may then generate updated response information based on the updated attack data. For example, if the updated attack data indicates that the attack has subsided or ceased, central management system 1210 may send information to the various distributed filtering devices indicating that rate limiting may be stopped. In this manner, central management system 1210 may be used to set and control the distributed filtering and the associated rate limits based on information received from one or more network devices, such as firewalls, routers or intrusion detection systems.

Router D may also respond to the attack information by configuring its filters based on the attack information. Router D, as discussed above, may receive attack information from central management system 1210 and configure its filters based on the attack information.

Central management system 1210 may also perform support functions related to attack detection and prevention, such as logging events associated with the attack or collecting other information regarding the attacks. Central management system 1210 is illustrated as being located in the network, but in other embodiments consistent with the principles of the invention central management system 1210 may be located outside the network, or may be implemented as part of a network device, such as router D. In other embodiments consistent with the principles of the invention, central management system 1210 is comprised of distributed components. For example, the components may be distributed in the network, outside the network, or both. The components cooperate to collect and process attack information, forward attack information to routers in the network for distributed filtering.

Although FIG. 12 illustrates two firewalls, in another embodiment consistent with the principles of the invention, there may be a combination of servers with firewalls and physically separate firewalls, each implementing complex stateful filters that are needed for initial detection of attacks, such as DOS and DDOS attacks. The servers and firewalls may be centrally located or distributed, and may be connected to the network through a single router, or through multiple other devices.

Dual-Homed Firewall

Figure 13:
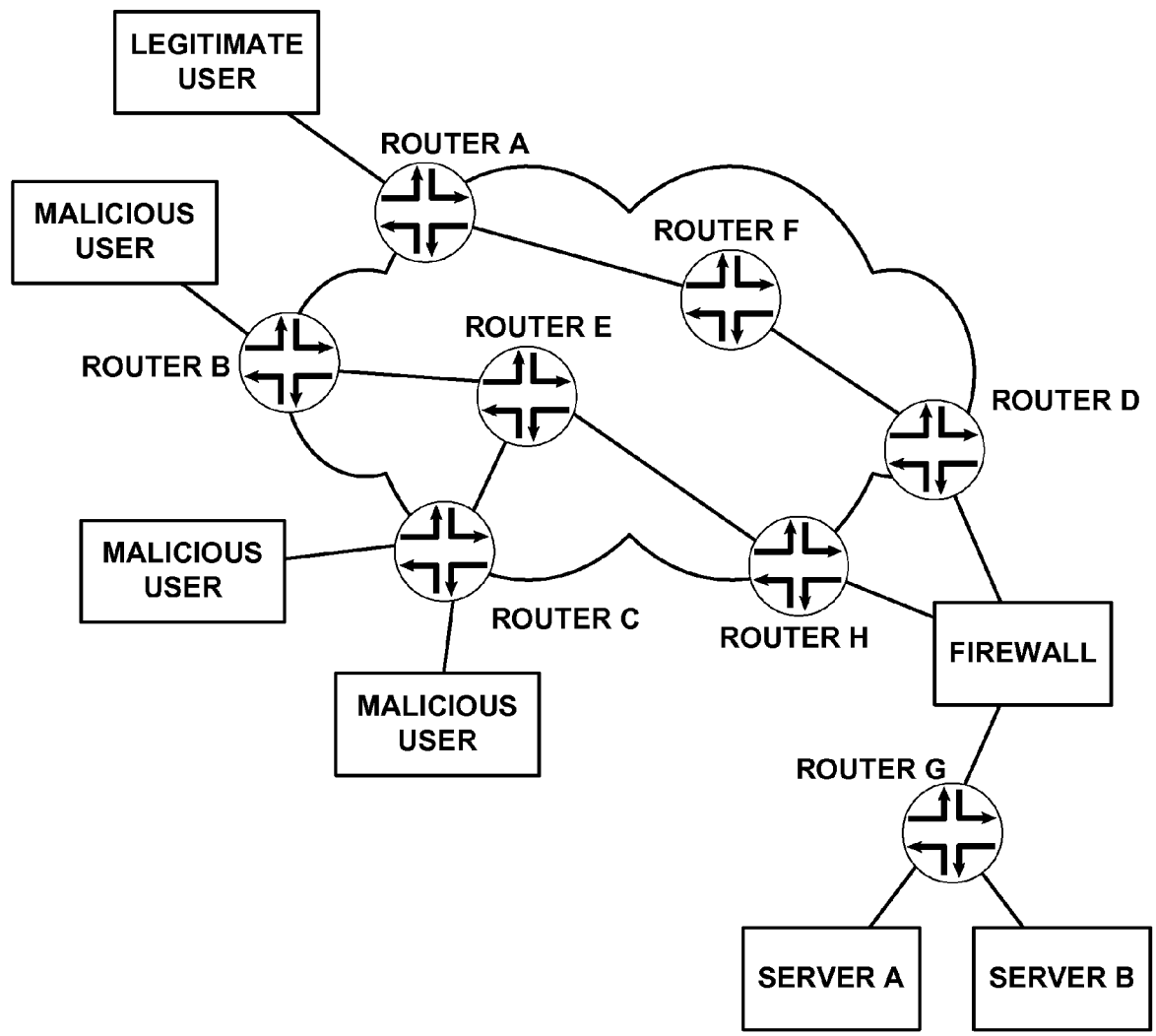
FIG. 13 illustrates a dual-homed firewall.

FIG. 13 illustrates a dual-homed firewall. This dual-homed firewall has interfaces to two different routers, routers D and H, towards the core of the network. In this case, it is necessary to ensure that router D does not try to forward traffic destined for router H via the firewall. Ensuring that router D does not try to forward traffic destined for router H via the firewall may depend upon which link state routing protocol is used, as well as the particular method used to insert attack information into the routing protocols. With proxy operation, for example, the firewall does not participate in operation of the routing protocol, so this problem does not occur.

For some link state routing protocols (e.g., IS-IS, PNNI) it is possible for systems to say that they are "non-transit" or "reduced operation." In this case, a router will not choose to forward packets via that system unless there is no other path available.

In other cases, the metrics assigned to links can be set to prevent incorrect routing. For example, suppose that in FIG. 13 the links between the firewall and router D and router H are set to have very large metric values. In this case, if router D has a packet destined for router H, it will choose a different path in order to avoid the large-metric costs on the paths via the firewall.

CONCLUSION

Although the embodiments described herein have been described mainly in conjunction with using a firewall to detect attacks, in other embodiments consistent with the principles of the invention, a router, a server, an intrusion detection system or other network device may be used to monitor network traffic, detect an attack, develop attack information based on the attack, and send the attack information to other devices in the network. The other devices can then configure themselves based on the attack information to detect and discard particular types of network traffic. The other devices may also rate limit the particular types of network traffic and adjust the rate limiting based on network conditions. Although the embodiments described herein focused on single attacks to explain aspects of the invention, it is understood that systems and methods consistent with the principles of the invention also handle multiple simultaneous attacks. After an attack detection device detects an attack and forwards attack information to attack response devices, the attack detection device will in general continue monitoring for other attacks. Similarly, the attack detection device may discover multiple attacks over time, or multiple different attack detection devices may discover multiple attacks, and therefore at any one point in time the attack response devices may have multiple filters in effect discarding or rate limiting attack traffic.

Also, systems, devices and methods consistent with the invention have been described as processing data packets. In alternative implementations, system, devices and methods consistent with the principles of the invention may process other, non-packet data. In addition, certain portions of the invention may have been described as "logic" that performs one or more functions. This logic may include hardware, such as an application specific integrated circuit (ASIC) or a field programmable gate array (FPGA), software or a combination of hardware and software. Further, while series of acts have been described in relation to FIGS. 4, 6, 10 and 11, the order of the acts may vary in other implementations when a particular order is not required and non-dependent acts may be performed in parallel. In addition, while some processing has been described as being performed by particular components of the various network devices, it should be understood that the processing described as being performed by one component may be performed by other components in alternative implementations of the present invention.

Other embodiments of the invention will be apparent to those skilled in the art from consideration of the specification and practice of the invention disclosed herein. For example, while the invention has been described in connection with configuring a router to detect and discard malicious packets, embodiments consistent with the principles of the invention may also be used, for example, in a switch, a server or other networking devices in systems that undergo attacks. It is intended that the specification and examples be considered as exemplary only, with a true scope and spirit of the invention being indicated by the following claims.

What is claimed is:

1. A system for detecting and responding to an attack, the system comprising:
   a first device comprising a first device processor, where the first device processor is configured to:
   receive data from a network,
   detect the attack based on the received data,
   transmit, via the network, first control information, the first control information comprising:
      information indicating that an attack has been detected, and
      one or more characteristics of the received data related to the attack;
   receive additional data from the network after the first control information has been transmitted, and
   transmit updated rate limit information based on an amount of the additional data received and a processing capability of a device to which the additional data is destined; and
   a plurality of second devices positioned upstream from the first device, where each of the plurality of second devices comprises a second device processor and where the second device processor for one of the plurality of second devices is configured to:
   receive the first control information,
   determine, based on a topology of the network and the one or more characteristics, whether to apply the first control information,
   when the second device processor determines to apply the first control information at the one of the plurality of second devices, limit, based on the first control information, a rate at which data is forwarded by the one of the plurality of second devices; and when the second device processor determines not to apply the first control information at the one of the plurality of second devices, forward, based on the topology of the network, the first control information to another of the plurality of second devices.

2. The system of claim 1, where the first device processor is further configured to:

receive additional data, from the network and via one or more of the plurality of second devices, after the first control information has been transmitted, determine that the additional data exceeds a threshold, and transmit second control information to the plurality of second devices, in response to determining that the additional data exceeds the threshold, the second control information instructing one or more of the plurality of second devices to lower the rate at which data is forwarded.

3. The system of claim 2, where the second control information comprises information identifying a plurality of categories of data and rate limit information for each of the plurality of categories, and where the second device processor is further configured to:

identify data corresponding to the plurality of categories, and limit the rate of data being forwarded for each of the plurality of categories based on the rate limit information.

4. The system of claim 1, where the second device processor is further configured to:

classify received data into a plurality of categories, assign rate limits to the plurality of categories, where at least two of the plurality of categories are assigned different respective ones of the rate limits, and filter additional received data for each of the plurality of categories based on the assigned rate limits.

5. The system of claim 1, where the first control information identifies at least a first category of the received data and a corresponding rate limit for the first category, and where the second device processor is further configured to:

identify additional data corresponding to the first category, and filter the additional data corresponding to the first category based on the rate limit information for the first category.

6. The system of claim 1, where the first device processor is further configured to:

transmit, via the network, second control information to at least one of the plurality of second devices, the second control information identifying a first category of data and indicating that the at least one of the plurality of second devices is to guarantee a data bandwidth for the first category of data.

7. The system of claim 6, where the second device processor is further configured to:

receive the second control information, and forward substantially all of the data associated with the first category.

8. The system of claim 1, where the first device comprises at least one of a firewall, a router, or an intrusion detection system, and the one of the plurality of second devices comprises a router.

9. A method, comprising:

receiving, by a second device in a network, first control information, where the first control information is transmitted by a first device in the network, and where the first control information includes:

an indication that an attack has been detected by the first device, and characteristics of data associated with the attack;

determining, by the second device, a third device based on a topology of the network and the characteristics of data associated with the attack;

transmitting, by the second device, the first control information to the third device;

transmitting, from the first device, second control information that includes updated rate limit information based on an amount of additional data received by the first device and processing capability of a device to which the additional data is destined; and rate limiting, by the third device and based on characteristics in the first control information, an amount of data forwarded downstream by the third device, where rate limiting, by the third device, is further based on the second control information.

10. The method of claim 9, further including:

transmitting, by the third device, the first control information to at least one other device in the network.

11. The method of claim 9, further comprising:

receiving additional data at the first device after the first control information has been transmitted;

determining that an amount of the received data exceeds a threshold;

generating, based on the amount and the threshold, second control information that include updated rate limits; and transmitting the updated rate limits to the second device.

12. The method of claim 9, further comprising:

identifying a received data packet based on at least one parameter associated with the data packet; and classifying, by the second device, the data packet in one of a plurality of categories, where the rate limiting comprises:

limiting an amount of data being forwarded for each of the categories based on a corresponding rate limit for each category.

13. The method of claim 12, where a first category of data comprises data associated with originating a communication session, the method further comprising:

setting the corresponding rate limit associated with the first category relatively lower than others of the corresponding rate limits associated, respectively, with other ones of the plurality of categories.

14. The method of claim 9, where the attack is a denial of service attack.

15. A system for detecting and responding to an attack, the system comprising:

a first device comprising a first device processor, where the first device processor is configured to:

receive and forward data in a network, count an amount of received data having particular characteristics, and transmit first control information via the network, the first control information comprising information representing the amount of received data having the particular characteristics and a topology of the network;

at least one second device, each of the at least one second device comprising a second device processor, where the second device processor is configured to:

receive the first control information, generate second control information based on the first control information and a processing capability of a device to which the data is destined, and transmit the second control information; and at least one third device, each of the at least one third device comprising a third device processor, where the third device processor is configured to:
   receive the second control information, and
   limit a rate at which data is forwarded by the at least one third device based on the second control information.

16. The system of claim 15, where the at least one second device is a network management station.

17. The system of claim 15, where the at least one second device comprises a network management station and when generating the second control information, the second device processor of the network management station is further configured to:
   at least one of log or modify the first control information,
   present at least one of information or alerts to a network operator based on the first control information, and
   receive commands from the network operator.

18. The system of claim 17, where, when generating the second control information, the second device processor of the network management station is further configured to:
   use the commands from the network operator and at least one of historical and configuration data to generate the second control information.

19. The system of claim 15,
where the first device processor is further configured to:
   receive additional data via the network after the first control information has been transmitted,
   count the amount of received additional data having the particular characteristics over predetermined periods of time, and
   transmit updated first control information via the network at predetermined intervals, the updated first control information comprising information representing the amount of received additional data having the particular characteristics over the predetermined periods of time;

where the second device processor is further configured to:
   receive the updated first control information,
   generate updated second control information based on the updated first control information, and
   transmit the updated second control information; and where the third device processor is further configured to:
   receive the updated second control information, and
   adjust the rate at which data is forwarded by the third device based on the updated second control information.

20. The system of claim 19, where the second device is a network management station and when generating the updated second control information, second device processor of the network management station is further configured to:
   at least one of log or modify the updated first control information,
   present at least one of information or alerts to a network operator based on the first control information and the updated first control information, and
   receive commands from the network operator.

21. The system of claim 20, where the updated second control information is based on at least one of the first control information, the updated first control information, historical data associated with the network, or configuration data associated with the network.

22. The system of claim 15, where the at least one third device comprises a plurality of third devices, and where the third device processor, for one of the plurality of third devices, is further configured to:
   determine, based on the topology of the network and the second control information, not to limit a rate at which data is forwarded by the one of the plurality of third devices, and
   forward, based on the topology of the network, the second control information to another of the plurality of third devices, where the rate at which data is forwarded by the other of the plurality of third devices is limited based on the second control information.

\* \* \* \* \*